US006640621B2

United States Patent
Ward et al.

(10) Patent No.: US 6,640,621 B2
(45) Date of Patent: Nov. 4, 2003

(54) DIAGNOSTIC METHOD FOR A SHAFT SENSOR IN A RECIPROCATING INTERNAL COMBUSTION ENGINE

(75) Inventors: James D. Ward, Royal Oak, MI (US); Alton L. Schuessler, Flushing, MI (US); Kenneth M. Simpson, Howell, MI (US); Hallett D. Breidenbach, West Bloomfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 134 days.

(21) Appl. No.: 09/983,465

(22) Filed: Mar. 29, 2001

(65) Prior Publication Data

US 2002/0092344 A1 Jul. 18, 2002

Related U.S. Application Data

(60) Provisional application No. 60/208,236, filed on May 31, 2000.

(51) Int. Cl.[7] ............................................. G01M 15/00
(52) U.S. Cl. ..................................... 73/118.2; 73/118.2
(58) Field of Search ................................ 73/116, 117.3, 73/117.2, 118.2, 118.1; 123/179.16, 419, 425, 431.07, 431.08, 436, 491, 90.15, 438, 494, 479, 684

(56) References Cited

U.S. PATENT DOCUMENTS

| | | | | |
|---|---|---|---|---|
| 4,402,217 A | * | 9/1983 | Higashiyama | 73/117.3 |
| 5,824,890 A | * | 10/1998 | Le Palm et al. | 73/117.3 |
| 6,425,362 B1 | * | 7/2002 | Kanno | 123/179.16 |

* cited by examiner

Primary Examiner—Kamand Cuneo
Assistant Examiner—Monica D. Harrison
(74) Attorney, Agent, or Firm—Jimmy L. Funke

(57) ABSTRACT

An improved method of diagnosing shaft sensor failure in a reciprocating internal combustion engine verifies engine rotation by sensor information responsive to dynamic variation in engine air intake that occurs during engine rotation. Failure of the shaft sensor is diagnosed when the dynamic variation in engine air intake is detected in the absence of a shaft sensor signal. The sensor information used to detect the dynamic variation in intake air may be obtained from either a mass air flow sensor disposed in a throttle passage of the engine, or from a pressure sensor disposed in an intake manifold of the engine, and virtually all current engine control systems utilize at least one of these sensors. The dynamic variation is detected by recognizing rising and falling segments of the signal waveform, by comparing the relative manifold pressure to predetermined maximum and minimum values, or by using a derivative of the signal waveform to recognize its inflection points.

7 Claims, 6 Drawing Sheets

DIAGNOSTIC METHOD FOR A SHAFT SENSOR IN A RECIPROCATING INTERNAL COMBUSTION ENGINE

This application claims priority to U.S. Provisional Application No. 60/208,236 filed May 31, 2000.

TECHNICAL FIELD

This invention relates to shaft motion sensing in a reciprocating internal combustion engine, and more particularly to a method of diagnosing proper operation of a shaft sensor.

BACKGROUND OF THE INVENTION

Control systems for reciprocating internal combustion engines rely extensively on input signals obtained from various types of sensors. One of the most important inputs is obtained from a sensor (usually a magnetic flux responsive sensor) positioned in proximity to the teeth of a rotary wheel such the engine flywheel gear for providing an indication of crankshaft movement; typically, this input is used by the engine controller to determine both engine crankshaft position (rotary orientation) and speed for purposes of properly regulating control parameters such as spark timing and fuel delivery. Accordingly, it is highly desirable to promptly diagnose crankshaft sensor failures so that alternate or default control strategies may be initiated. Since the use of redundant sensors is usually cost prohibitive, failure of the crankshaft sensor is sometimes diagnosed on the basis of an input provided by a camshaft sensor, as the camshaft is mechanically coupled to the crankshaft. However, not all engine control systems include a camshaft sensor. Accordingly, what is desired is a method of diagnosing crankshaft sensor failures based on sensor information that is routinely available in an engine control system.

SUMMARY OF THE INVENTION

The present invention is directed to an improved method of diagnosing shaft sensor failure in a reciprocating internal combustion engine in which engine rotation is verified by sensor information responsive to dynamic variation in engine air intake that occurs during engine rotation, and failure of the shaft sensor is diagnosed when the dynamic variation in engine air intake is detected in the absence of a shaft sensor signal. The sensor information used to detect the dynamic variation in intake air may be obtained from either a mass air flow sensor disposed in a throttle body of the engine, or from a pressure sensor disposed in an intake manifold of the engine, and virtually all current engine control systems utilize at least one of these sensors. Three different methodologies for detecting dynamic variation of the air intake signal are described. According to a first embodiment, the variation is detected by recognizing rising and falling segments of the signal waveform. In a second embodiment, the variation is detected by computing a relative manifold pressure and comparing it to predetermined maximum and minimum values. In a third embodiment, the variation is recognized by using a derivative of the signal to recognize the waveform inflection points.

DESCRIPTION OF THE PREFERRED EMBODIMENT

Figure 1:
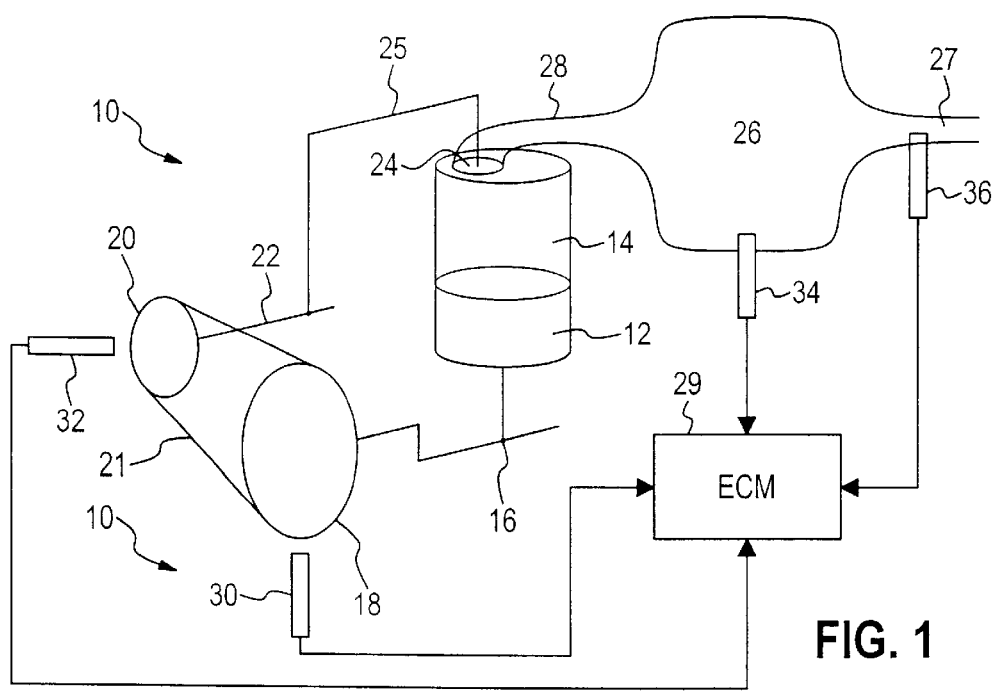
FIG. 1 is a schematic diagram of selected components of an engine control system according to this invention, including an intake manifold absolute pressure sensor and a microprocessor-based engine control module.

The present invention is disclosed in the context of an engine control system including a four-cylinder gasoline engine generally designated in FIG. 1 by the reference numeral 10. Referring to FIG. 1, the engine 10 includes four pistons 12 (only one of which is shown) which reciprocate in respective cylinders 14 and are connected to crankshaft 16. The crankshaft 16 is connected to the crank-wheel 18, which is mechanically coupled to a cam-wheel 20 by a belt or chain 21 so that the crank-wheel 18 and the cam-wheel 20 rotate synchronously. The cam-wheel 20 is connected to a camshaft 22, which opens and closes a cylinder intake valve 24 through a mechanical linkage 25 in coordination with the movement of piston 12. Intake air enters an intake manifold 26 through a throttle passage 27, and is delivered to each of the cylinders 14 via a respective intake runner 28 and intake valve 24. Obviously, engine 10 includes many other component parts that are also conventional and known in the state of the art to be part of an operational engine system.

The operation of engine 10 is regulated by a microprocessor-based engine control module (ECM) 29 in response to a number of inputs, including a crankshaft position signal developed by a sensor 30 responsive to movement of crank-wheel 18, and a manifold absolute pressure (MAP) signal developed by a pressure sensor 34 responsive to the air pressure in intake manifold 26. Optionally, a sensor 32 may be provided as shown to detect movement of the cam-wheel 20. In some systems, a mass air-flow (MAF) sensor 36 is utilized to measure the intake air-flow in throttle passage 27; most systems use either a MAP sensor or a MAF sensor, but some systems use both.

As indicated above, the present invention is directed to a method of diagnosing a failure of sensor 30 based on an analysis of signals responsive to dynamic variation in engine air intake that occurs during engine rotation; such a signal may be provided by either MAP sensor 34 or MAF sensor 27. In the ensuing description, however, a diagnostic method based on the MAP signal is described.

Figure 2:
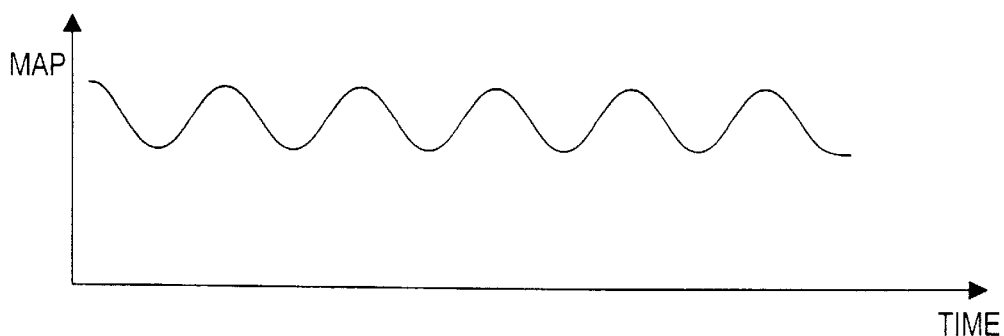
FIG. 2 is a graph depicting typical fluctuations of intake manifold absolute pressure in a four-cylinder gasoline engine as a function of time.

Referring to FIG. 2, the trace 102 depicts a typical variation in the MAP signal with respect to time during rotation (crank or run) of the four-cylinder engine 10. The variation occurs due to the reciprocation of pistons 12 within the respective cylinders 14. When a respective intake valve 24 is opened and the piston 12 moves downward as viewed in FIG. 1, the cylinder volume is enlarged, and air is drawn into the cylinder 14 from intake manifold 26, reducing the MAP signal. The reduction in pressure causes ambient air to enter intake manifold 26 through throttle passage 27, restoring the pressure in intake manifold 26. This process occurs repetitively for each of the cylinders 14, resulting in the periodic MAP signal fluctuation depicted by the trace 102. It will be recognized, of course, that the MAF signal is subject to a very similar fluctuation.

According to this invention, ECM 29 detects the signal fluctuation due to the aforementioned dynamic variation in intake air during engine rotation, and diagnoses a failure of the sensor 30 when the dynamic variation is detected in the absence of a crankshaft position signal. Three different methodologies for detecting the MAP signal fluctuation are described below. In the first methodology, described in reference to FIGS. 3–4 and the flow chart of FIG. 9, the signal fluctuation is detected by recognizing rising and falling segments of the MAP waveform. In the second methodology, described in reference to FIGS. 5–6 and the flow chart of FIG. 10, the signal fluctuation is detected by comparing the relative manifold pressure to predetermined maximum and minimum values. In the third methodology, described in reference to FIGS. 7–8 and the flow chart of FIG. 11, the signal fluctuation is detected by computing a derivative of the MAP waveform to recognize its inflection points. Once a predetermined number of MAP cycles have been identified, the engine crankshaft 16 is deemed to be turning, and a failure of the sensor 30 is diagnosed if a crankshaft position signal is not present.

Figure 3:
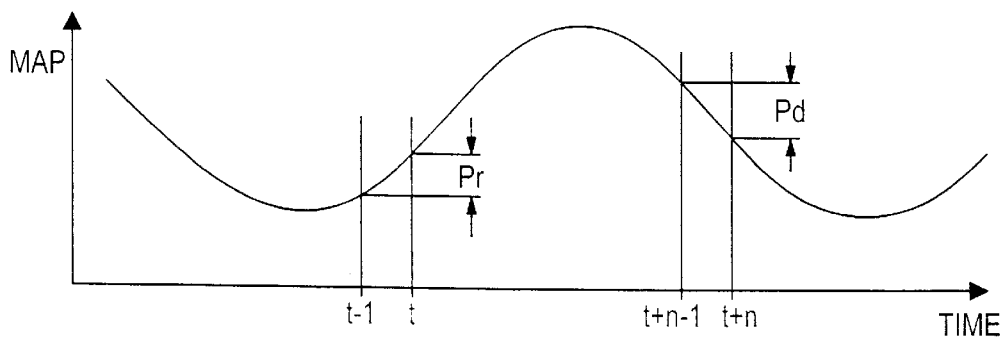
FIG. 3 is a graph depicting one cycle of the waveform of FIG. 2, marked to identify waveform segments used to recognize fluctuation according to a first embodiment of this invention.
Figure 4:
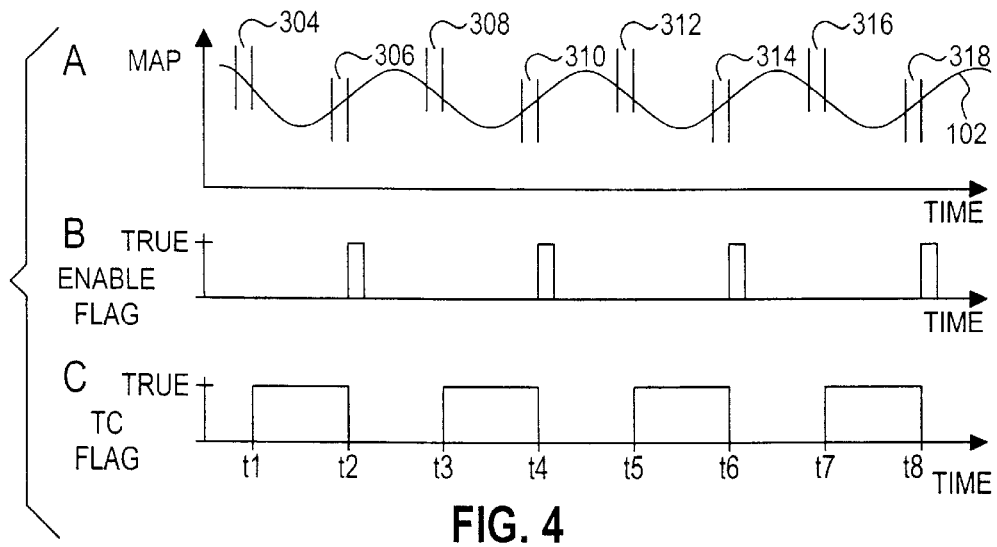
FIG. 4, Graphs A, B and C, illustrates the waveform of FIG. 2 and transition timing signals developed according to the first embodiment.

Referring to FIGS. 3–4, rising and falling segments of the MAP waveform characteristic of engine rotation are identified by recognizing successive pressure rises Pr and pressure drops Pd per unit time (that is, positive and negative slopes) in excess of respective predetermined thresholds. FIG. 3 depicts a representative cycle of the waveform, along with a detected pressure rise Pr and pressure drop Pd in the respective time intervals t−1 to t and t+n−1 to t+n. An extended segment of the same waveform is depicted in Graph A of FIG. 4, showing several identified rising segments 306, 310, 314 and 318 and several identified falling segments 304, 308, 312 and 316. Graphs B and C depict Flags used to identify the rising and falling segments. The Enable Flag, depicted in Graph B, is briefly set to indicate that a rising segment has been identified, and the Transition Complete Flag, depicted in Graph C, changes state at each rising and falling segment identification. At such point as rising segments 306, 310, 314 and 318 are identified and the Transition Complete Flag is set, the Enable Flag is set to indicate that this identification has been made, and the Transition Complete Flag is reset, as can be seen at times t2, t4, t6 and t8. At such point as falling segments 304, 308, 312 and 316 are identified and the Transition Complete Flag is not set, the Transition Complete Flag is set to indicate that this identification has been made, as can be seen at time t1, t3, t5 and t7.

Figure 9:
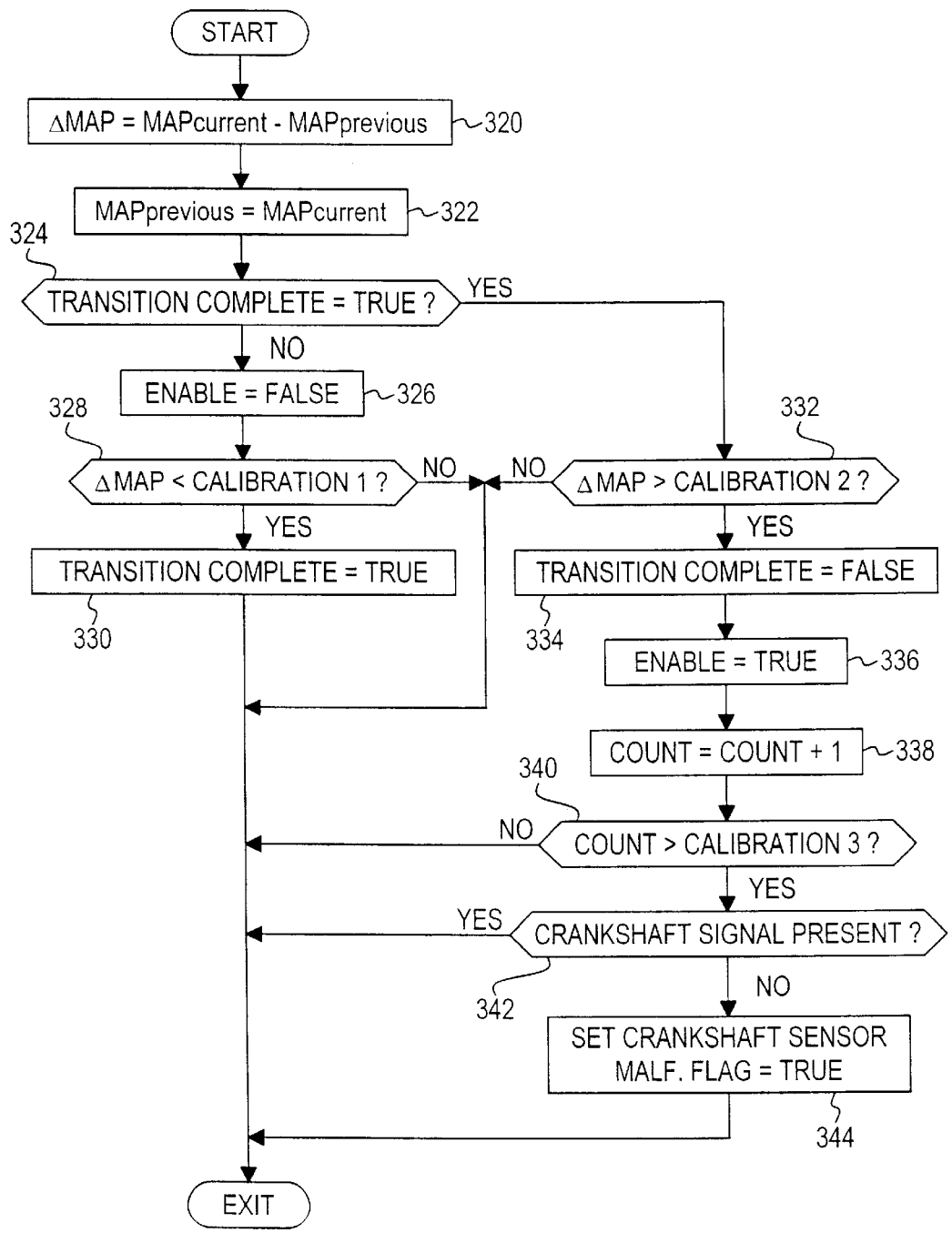
FIG. 9 is a flowchart representing a software routine executed by the engine control module of FIG. 1 in carrying out the first embodiment of this invention.

A software routine periodically executed by ECM 29 for carrying out this methodology is depicted in FIG. 9, where blocks 320 and 322 are first executed to calculate the change in MAP from the value stored during the previous execution of the routine, and to store the current value of MAP for use in the next execution of the routine. If the Transition Complete Flag is false, as determined at block 324, the block 326 sets the Enable Flag to False, and the block 328 checks for a falling MAP waveform segment by comparing the computed change in MAP to a negative threshold (Calibration 1). As soon as a falling segment is identified, the block 330 sets the Transition Complete Flag to True so that in the next execution of the routine, the block 332 will be executed to check for a rising segment. Checking for a rising MAP waveform segment involves comparing the computed change in MAP to a positive threshold (Calibration 2), as indicated at block 332. If the change in MAP is greater than Calibration 2, a rising segment is identified, and the blocks 334, 336 and 338 are executed to set the Transition Complete Flag to false, to set the Enable Flag to true, and to increment a count of the number of cycles in which conditions have been correct to set the Enable Flag. If the count exceeds a threshold (Calibration 3), as determined at block 340, the crankshaft is deemed to be rotating, and block 342 checks if the crankshaft signal is present. If so, the routine is exited; if not, the block 344 sets the Crankshaft Sensor Malfunction Flag to True.

Figure 5:
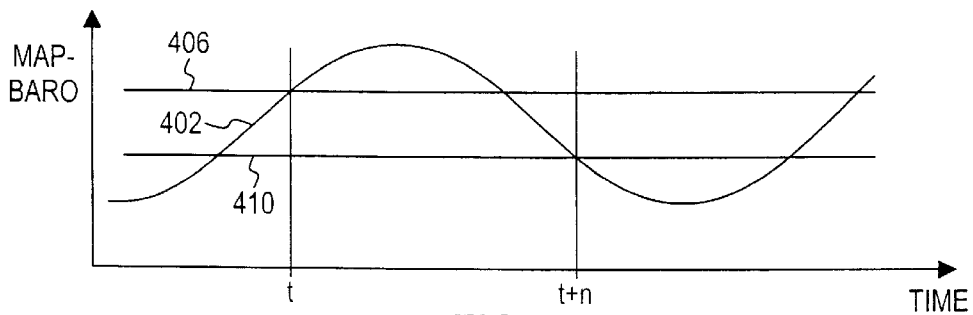
FIG. 5 is a graph depicting one cycle of a relative MAP signal, along with maximum and minimum thresholds according to a second embodiment of this invention.
Figure 6:
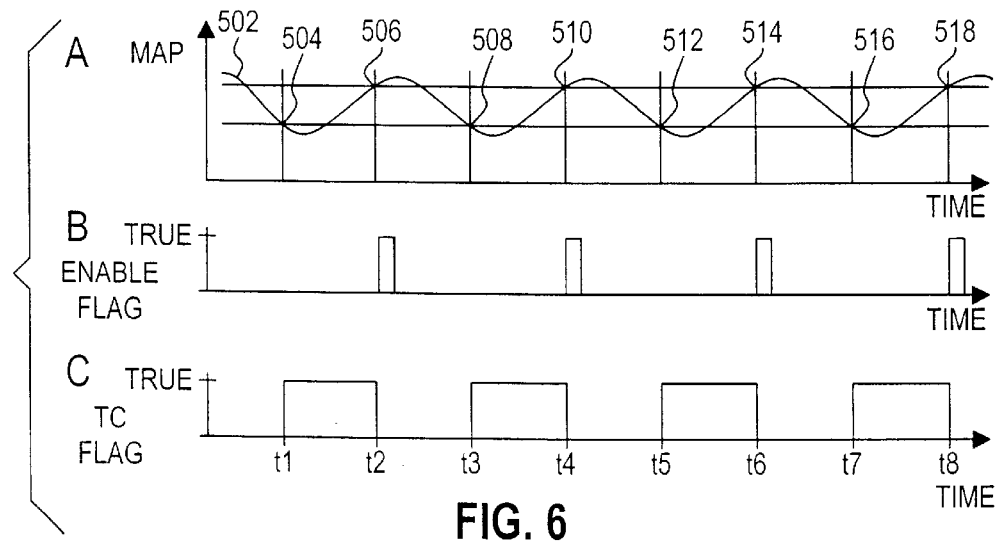
FIG. 6, Graphs A, B and C, illustrates an extended version of the waveform of FIG. 2 and transition timing signals developed according to the second embodiment.

In FIG. 5 and Graph A of FIG. 6, the traces 402 and 502 respectively depict the relative manifold pressure—that is, the difference between MAP and the ambient barometric pressure BARO (which is also a measured quantity) as a function of time. In this embodiment, the relative manifold pressure is compared to predetermined maximum and minimum thresholds identified by the traces 406 and 410, respectively. In the extended waveform segment of Graph A of FIG. 6, crossings of the maximum threshold 406 are identified by the reference numerals 506, 510, 514 and 518 and crossings of the minimum threshold 410 are identified by the reference numerals 504, 508, 512 and 516. As in FIG. 4, Graph B depicts the Enable Flag, and Graph C depicts the Transition Complete Flag. At such points as the waveform exceeds the maximum threshold 408 (points 506, 510, 514 and 518) and the Transition Complete Flag is set, the Enable Flag is set to indicate that this identification has been made and the Transition Complete Flag is reset as can be seen at time t2, t4, t6 and t8. At such point as the waveform falls below the minimum threshold 410 (points 504, 508, 512 and 516) and the Transition Complete Flag is not set, the Transition Complete Flag is set to indicate that this identification has been made as can be seen at time t1, t3, t5 and t7.

Figure 10:
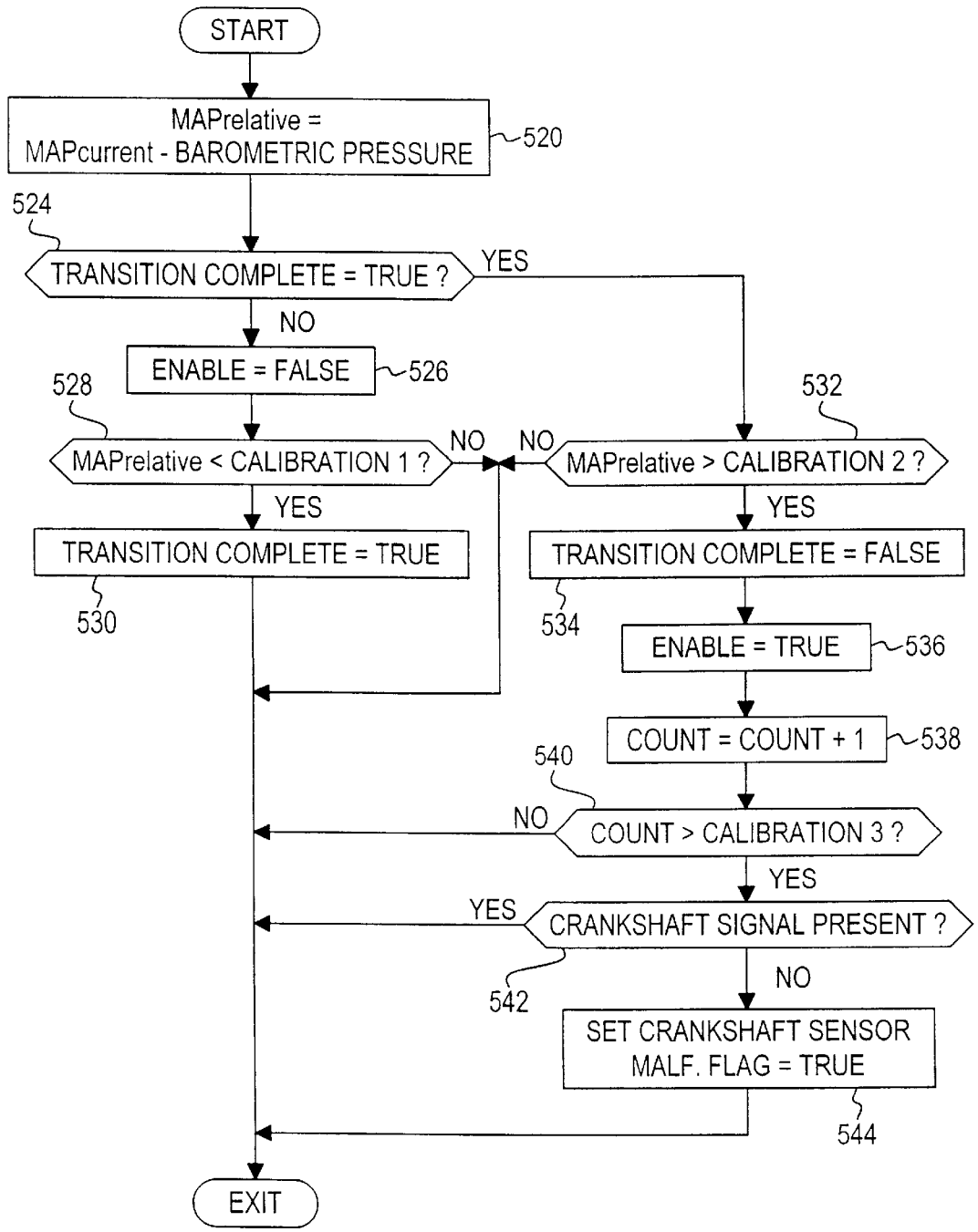
FIG. 10 is a flowchart representing a software routine executed by the engine control module of FIG. 1 in carrying out the second embodiment of this invention.

A software routine periodically executed by ECM 29 for carrying out this methodology is depicted by the flow chart of FIG. 10, where block 520 is first executed to calculate the relative MAP according to the difference (MAP—BARO). If the Transition Complete Flag is false, as determined at block 524, the block 526 sets the Enable Flag to False, and the block 528 compares relative MAP to a negative threshold (Calibration 1). When relative MAP falls below Calibration 1, the block 530 sets the Transition Complete Flag to True so that in the next execution of the routine, the block 532 will be executed to check for a positive-going fluctuation. The block 532 compares the relative MAP to a positive threshold (Calibration 2), and if the relative MAP exceeds Calibration 2, the blocks 534, 536 and 538 are executed to set the Transition Complete Flag to false, to set the Enable Flag to true, and to increment a count of the number of cycles in which conditions have been correct to set the Enable Flag. If the count exceeds a threshold (Calibration 3), as determined at block 540, the crankshaft is deemed to be rotating, and block 542 checks if the crankshaft signal is present. If so, the routine is exited; if not, the block 544 sets the Crankshaft Sensor Malfunction Flag to True.

Figure 7:
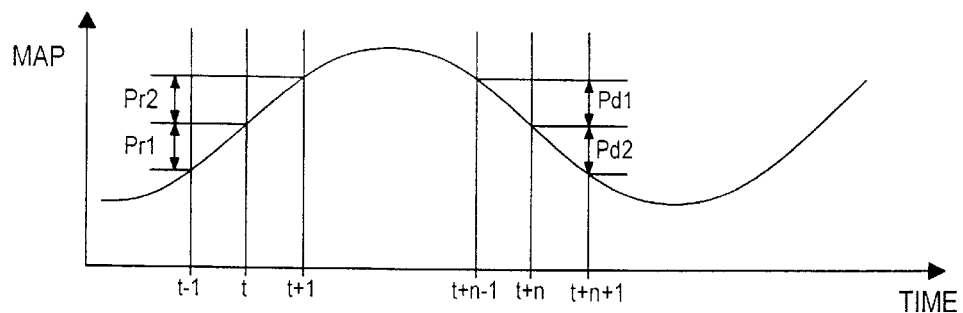
FIG. 7 is a graph depicting one cycle of the waveform of FIG. 2, along with data segments relating to a first derivative to recognize fluctuation according to a third embodiment of this invention.
Figure 8:
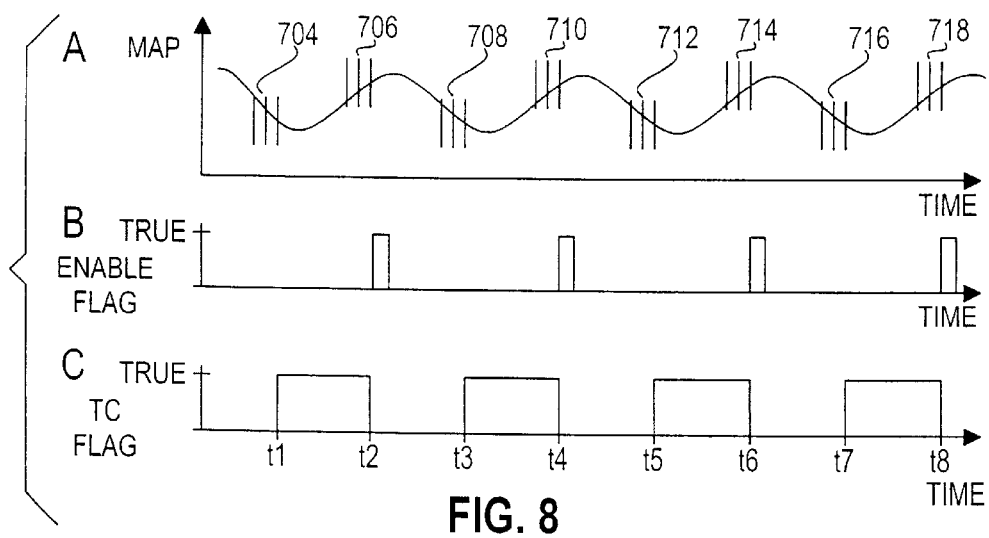
FIG. 8, Graphs A, B and C, illustrates the waveform of FIG. 2 and transition timing signals developed according to a third embodiment of this invention.

Referring to FIGS. 7–8, rising and falling segments of the MAP waveform characteristic of engine rotation are identified by using a derivative of the waveform to identify inflection points. In FIG. 7, the MAP waveform 102 may be sampled over several periods of time, specifically from time t−1 to t, from time t to t+1, from time t+n−1 to t+n and from time t+n to t+n+1. The difference of MAP change (pressure rise $P_{r1}$, $P_{r2}$ and pressure drop $P_{d1}$, $P_{d2}$) for each time period is calculated, along with the difference of two adjacent segments, so as to compute the mathematical derivative of the waveform. Thus the difference Pr1−Pr2 gives the derivative of the waveform at time t, and the difference Pd1−Pd2 gives the derivative at time t+n. When the derivative is very close to zero, an inflection point is recognized (i.e, the waveform changes from convex-to-concave or concave-to-convex), and it is expected that there will be only two inflection points during each cycle. Of course, a second or higher derivative of MAP waveform may be used since the waveform 102 closely approximates a sine wave and all degrees of derivative have the same shape but are shifted in time. An extended segment of the same waveform is depicted in Graph A of FIG. 8, showing several identified concave-to-convex inflection points 706, 710, 714 and 718 and several convex-to-concave inflection points 704, 708, 712 and 716. As in FIGS. 4 and 6, Graph B depicts the Enable Flag, and Graph C depicts the Transition Complete Flag. At such points as a rising inflection is identified (points 706, 710, 714 and 718) and the Transition Complete Flag is set, the Enable Flag is set to indicate that this identification has been made and the Transition Complete Flag is reset as can be seen at time t2, t4, t6 and t8 At such points as a falling inflection is identified (points 704, 708, 712 and 716) and the Transition Complete Flag is not set, the Transition Complete Flag is set to indicate that this identification has been made as can be seen at time t1, t3, t5 and t7.

Figure 11:
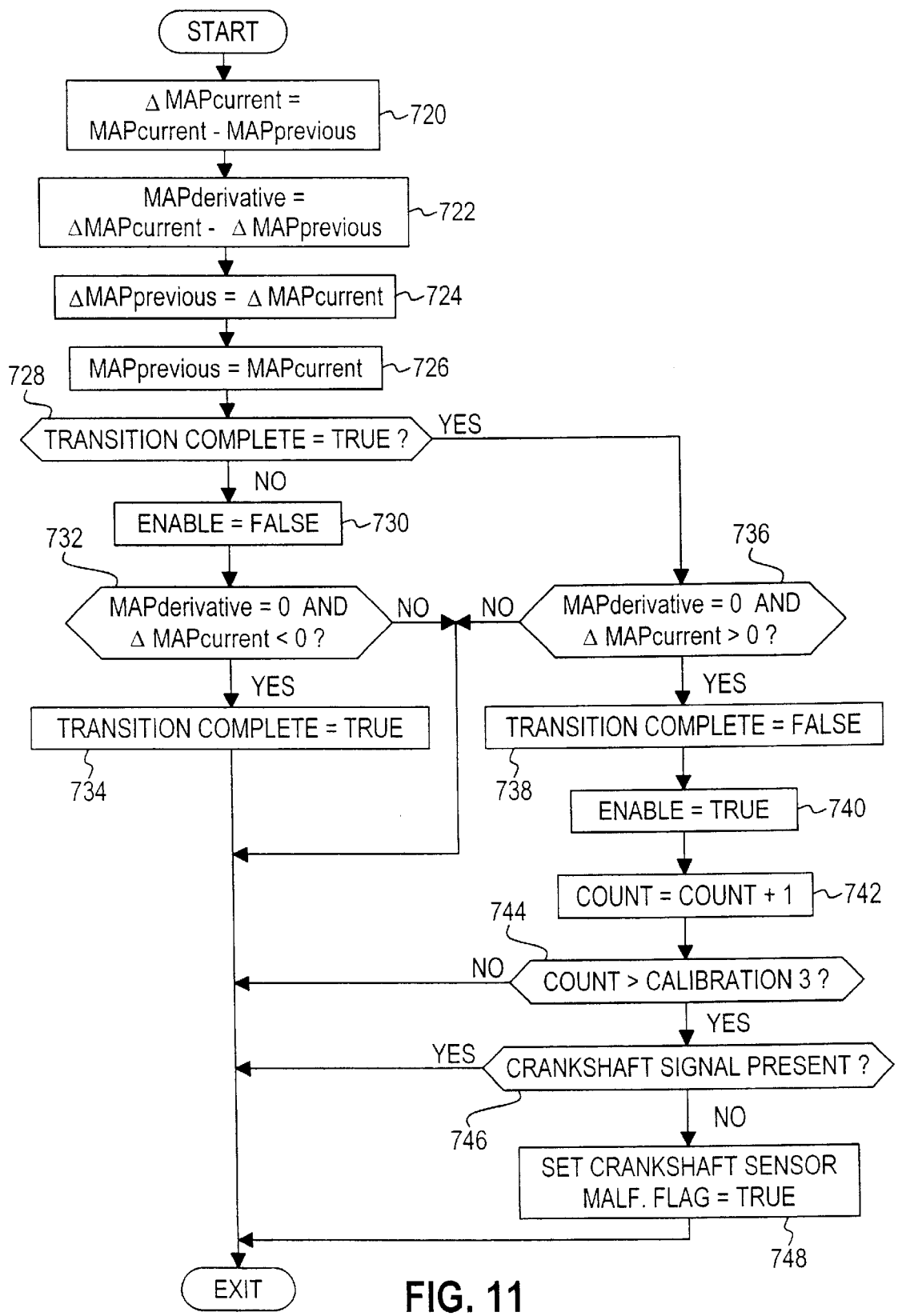
FIG. 11 is a flowchart representing a software routine executed by the engine control module of FIG. 1 in carrying out the third embodiment of this invention.

A software routine periodically executed by ECM 29 for carrying out this methodology is depicted in FIG. 11, where blocks 720, 722, 724 and 726 are first executed to calculate the change in MAP from the MAP value stored during the previous execution of the routine, to calculate the MAP derivative from the change in MAP values, and to store the current change in MAP and the current value of MAP for use in the next execution of the routine. If the Transition Complete Flag is false, as determined at block 728, the block 730 sets the Enable Flag to False, and the block 732 checks for a negative inflection point. If the computed MAP derivative is substantially zero and the change in MAP is negative, a negative inflection point is identified, and the block 734 sets the Transition Complete Flag to True so that in the next execution of the routine, the block 736 will be executed to check for a positive inflection point. Block 736 identifies a positive inflection point when the computed MAP derivative is substantially zero and the change in MAP is positive; in such case, the blocks 738, 740 and 742 are executed to set the Transition Complete Flag to false, to set the Enable Flag to true, and to increment a count of the number of cycles in which conditions have been correct to set the Enable Flag. If the count exceeds a threshold (Calibration 3), as determined at block 744, the crankshaft is deemed to be rotating, and block 746 checks if the crankshaft signal is present. If so, the routine is exited; if not, the block 748 sets the Crankshaft Sensor Malfunction Flag to True.

In summary, the above-described method provides a simple and cost-effective way of diagnosing failure of an engine shaft sensor such as the crankshaft sensor 30 based on sensor information responsive to dynamic variation in engine air intake that occurs during engine rotation. While the present invention has been described in reference to the illustrated embodiments, it is expected that various modifications in addition to those mentioned above will occur to those skilled in the art. For example, engine 10 may be two-stroke engine instead of a four-stroke engine, or may have fewer than or more than four cylinders. Accordingly, it will be understood that methods incorporating these and other modifications may fall within the scope of this invention, which is defined by the appended claims.

What is claimed is:

1. A diagnostic method for a reciprocating internal combustion engine system having a shaft sensor responsive to an engine shaft for producing a shaft signal indicative of movement of said engine shaft, the method comprising the steps of:

producing an air intake signal responsive to air intake of said engine;

analyzing said air intake signal to detect a dynamic variation in the air intake that is characteristic of engine rotation; and diagnosing a failure of said shaft sensor when said dynamic variation is detected but said shaft signal indicates that said shaft is not moving.

2. The diagnostic method of claim 1, wherein said air intake signal is produced by sensing mass airflow in a throttle passage of said engine.

3. The diagnostic method of claim 1, wherein said air intake signal is produced by sensing a pressure in an intake manifold of said engine.

4. The diagnostic method of claim 3, where the step of analyzing said air intake signal includes the steps of:

measuring an ambient air pressure;

computing a relative air pressure signal based on a difference between said air intake signal and the measured ambient air pressure;

comparing said relative air pressure signal to upper and lower thresholds to identify successive excursions of said relative air pressure signal above said upper threshold and below said lower threshold; and detecting a dynamic variation in said air intake when a predetermined number of said successive excursions have been identified.

5. The diagnostic method of claim 1, where the step of analyzing said air intake signal includes the steps of:

detecting increases and decreases of said air intake signal over given intervals of time;

identifying successive detected increases of said air intake signal in excess of a first threshold and detected decreases of said air intake signal in excess of a second threshold; and detecting a dynamic variation in said air intake when a predetermined number of said successive detected increases and decreases have been identified.

6. The diagnostic method of claim 1, where the step of analyzing said air intake signal includes the steps of:

determining a derivative of said air intake signal;

using the determined derivative to identify successive positive and negative inflections of said air intake signal; and detecting a dynamic variation in said air intake when a predetermined number of said successive positive and negative inflections have been identified.

7. The diagnostic method of claim 6, including the steps of:

computing changes in said air intake signal over a number of successive time intervals;

determining the derivative of said air intake signal based on a change in successively computed changes;

detecting a positive inflection of said air intake signal when said derivative is substantially zero and the computed change in the air intake signal is positive;

detecting a negative inflection of said air intake signal when said derivative is substantially zero and the computed change in the air intake signal is negative.

* * * * *